United States Patent [19]

Carson et al.

[11] 4,435,981
[45] Mar. 13, 1984

[54] AIRBORNE GRAVITY SURVEYING

[75] Inventors: Franklin D. Carson, Hilltown Township, Bucks County; William R. Gumert, East Rockhill Township, Bucks County, both of Pa.

[73] Assignee: Carson Helicopters, Inc., Perkasie, Pa.

[21] Appl. No.: 309,906

[22] Filed: Oct. 9, 1981

[51] Int. Cl.$^3$ .............................................. G01V 7/16
[52] U.S. Cl. .................................. 73/382 R; 324/331
[58] Field of Search ................... 73/382; 324/330, 331

[56] References Cited

U.S. PATENT DOCUMENTS

| | | | |
|---|---|---|---|
| 3,023,359 | 2/1962 | Jenny et al. | 324/331 |
| 3,242,736 | 3/1966 | Winter et al. | 73/382 X |
| 3,621,718 | 11/1971 | Ireland | 73/386 X |
| 3,960,344 | 6/1976 | Dugan | 324/330 |

FOREIGN PATENT DOCUMENTS 625063  8/1961  Canada .............................. 324/330

OTHER PUBLICATIONS

"Gravity Measurement at Sea and in the Air", by Lacoste from Reviews of Geophysics, vol. 5, No. 4, Nov. 1967, pp. 520–524.

Primary Examiner—James J. Gill
Attorney, Agent, or Firm—Z. T. Wobensmith, III

[57] ABSTRACT

Method and apparatus are disclosed for airborne gravity surveying in which the airborne vehicle is stabilized with respect to speed, direction of heading and altitude, and in which the gravity meter has adequate sensitivity and signals that are recorded at a high sample rate on a magnetic tape, in which the aircraft position is computed using a multi-range navigation system that is located geodetically.

17 Claims, 1 Drawing Figure

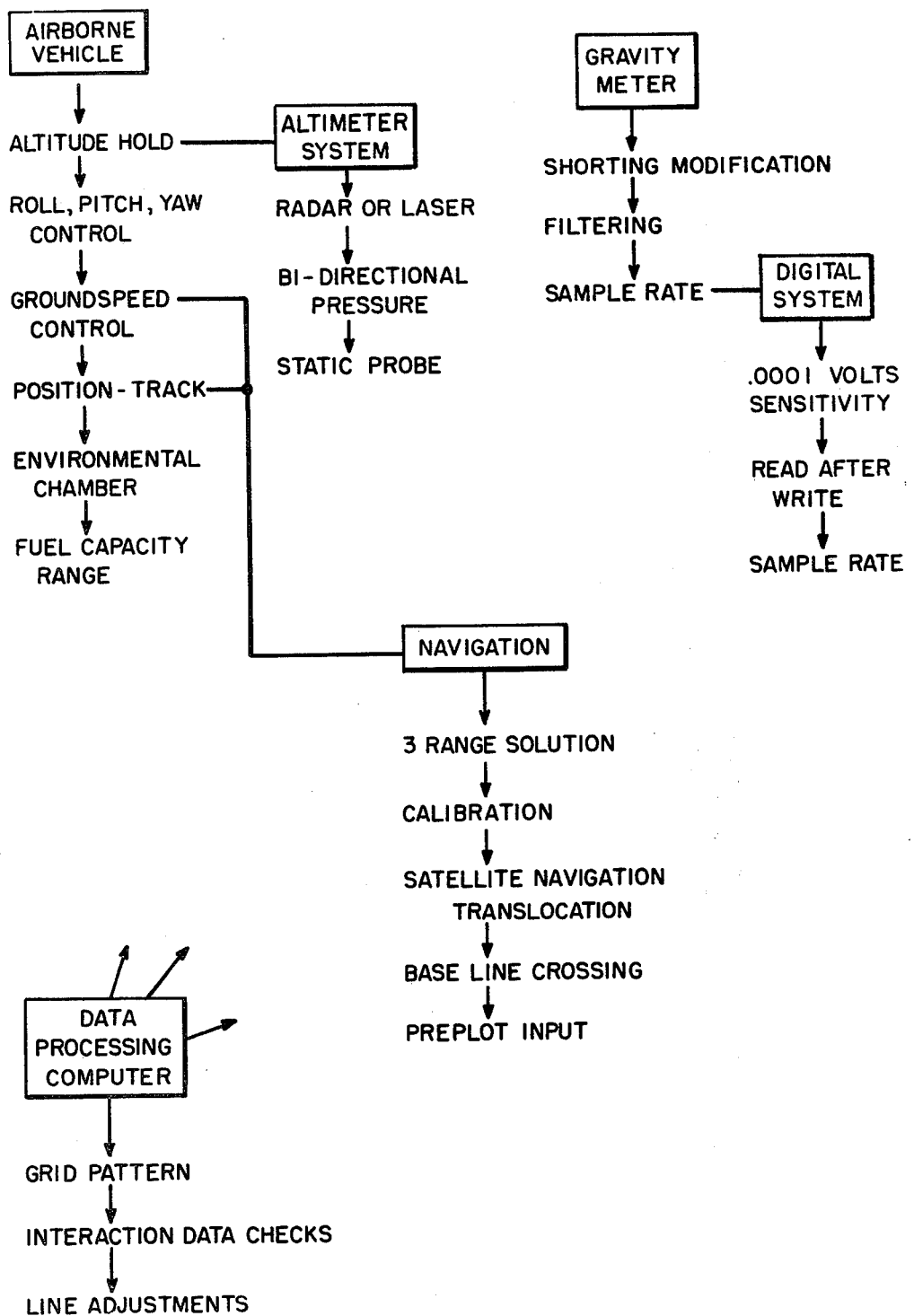

AIRBORNE GRAVITY SURVEYING

BACKGROUND OF THE INVENTION

1. Field of the Invention

This invention relates to airborne gravity surveying and more particularly to method and apparatus for such surveying with which greater accuracy is obtained than has heretofore been available.

2. Brief Description of the Prior Art

It has heretofore been proposed to use airborne vehicles for gravity surveying as pointed out in Reviews of Geophysics, Vol. 5, No. 4, Nov. 1967, pages 477 to 526, published by The American Geophysical Union of 2000 Florida Ave., N.W., Washington, DC 20009 commencing at page 520 to 524 with respect to fixed wing airborne vehicles.

A review of the activities with respect to helicopters can be found in "Airborne Gravity Surveying, Technical Information", published Mar., 1981, by Carson Geoscience, Perkasie, Pa., commencing at page 1—1.

Various patents have been issued which set forth apparatus for gravity surveying.

Boitnott, in U.S. Pat. Nos. 3,011,347 and 3,038,338, Gustafsson, U.S. Pat. No. 3,180,151 and Brede, U.S. Pat. No. 3,477,293, and Hutchins, Canadian Pat. No. 652,757 disclose instruments for measuring gravity or derivatives of gravity of the earth's gravity field but do not show practical systems for accurate airborne surveying.

La Coste, U.S. Pat. Nos. 2,293,437, 2,377,889, 2,964,948, 2,977,799; Heiland, U.S. Pat. No. 2,626,525; Worden, U.S. Pat. Nos. 2,674,887 and 3,211,003; Graf, U.S. Pat. No. 3,019,655; Emmerich, U.S. Pat. No. 3,033,037; Slater, U.S. Pat. No. 3,062,051; Hodge et al., U.S. Pat. No. 3,194,075; Ward, U.S. Pat. No. 3,495,460; Kuzivanov et al., U.S. Pat. No. 3,501,958; Wing, U.S. Pat. Nos. 3,546,943 and 3,583,225, show gravity meters but do not show practical systems for accurate airborne surveying.

Klasse et al., U.S. Pat. No. 2,610,226, Jensen, U.S. Pat. No. 2,611,802, and Rumbaugh et al., U.S. Pat. No. 2,611,803 show method and apparatus for conducting surveys for geophysical or magnetic explorations but do not discuss or treat airborne gravity surveying.

The proposals heretofore made for airborne surveying do not provide adequate stabilization for the aircraft, with respect to speed, do not provide very level flight, do not provide accurate navigation and steering, do not with these other requirements for accurate surveying, measure the gravity, and have other shortcomings.

SUMMARY OF THE INVENTION

In accordance with the invention an improved method and apparatus are provided for airborne gravity surveying in which the airborne vehicle is stabilized with respect to speed, direction of heading and altitude, and in which the gravity meter has adequate sensitivity and signals that are recorded at a high sample rate on magnetic tape, in which the aircraft position is computed using a multi-range navigation system that is located geodetically, it being preferable to survey during the night hours when the air is more stable.

It is the principal object of the invention to provide an improved method and apparatus for airborne gravity surveying with which greater accuracy of computed and recorded data is obtained.

It is a further object of the invention to provide an improved method and apparatus for airborne surveying which is preferably carried out when air conditions are relatively stable, the night hours frequently providing such stability.

It is a further object of the invention to provide an improved method and apparatus for airborne surveying in which the airborne vehicle is maintained at a selected level, and is stabilized as to speed and direction.

It is a further object of the invention to provide an improved method and apparatus for airborne gravity surveying in which the gravity meter is controlled as to its sampling and specifically the sampling rate.

It is a further object of the invention to provide an improved method and apparatus for airborne gravity surveying in which the position of the airborne vehicle is precisely known at all times.

It is a further object of the invention to provide an improved method and apparatus for airborne gravity surveying in which the airborne vehicle has adequate fuel supply for use at remote locations.

It is a further object of the invention to provide an improved method and apparatus in which the instruments are located and carried by the airborne vehicle at a stable temperature and preferably in a clean environment.

It is a further object of the invention to provide an improved method and apparatus for airborne surveying in which a probe is located in such a manner as to obtain an accurate measurement of the static air pressure.

It is a further object of the invention to provide an improved method and apparatus for airborne gravity surveying to provide a measurement of the distance of the airborne vehicle from the ground.

It is a further object of the invention to provide an improved method and apparatus for airborne gravity surveying to so construct the gravity meter so that it operates more efficiently in the airborne environment.

It is a further object of the invention to provide an improved method and apparatus for airborne gravity surveying including and providing a magnetic digital recording system with a high degree of sensitivity, variable sampling rate, and a capability of reading the magnetic tape in flight after data has been recorded thereon.

It is a further object of the invention to provide an improved method and apparatus for airborne gravity surveying to record on a magnetic tape multiple ranges from an electronic navigation system to enhance the position accuracy.

It is a further object of the invention to provide an improved method and apparatus for airborne gravity surveying to describe the method of data collection to provide the necessary parameters for computing accurate gravity measurement.

It is a further object of the invention to provide an improved method and apparatus for airborne gravity surveying to simultaneously record magnetic and gravity data.

It is a further object of the invention to provide an improved method and apparatus for airborne gravity surveying to describe the method of preplotting the required flight path and to require the airborne vehicle to comply with such a flight path.

It is a further object of the invention to provide for a grid pattern of lines to be flown to cover the gravity anomaly of the area to be covered.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawing forming part hereof in which:

The FIGURE shows a block diagram for purposes of understanding the invention.

DESCRIPTION OF PREFERRED EMBODIMENTS

Referring to the FIGURE any suitable airborne vehicle may be employed including fixed wing aircraft, lighter than air aircraft, and helicopters.

If a helicopter is employed one suitable helicopter is a Sikorsky model 61, which is preferably equipped with internal fuel tanks of a capacity of up to about 8 hours of flight. The helicopter preferably has a uniquely tuned automatic flight control system that uses collective lift to control the vertical movement of the vehicle during flight without changing the pitch.

For any airborne vehicle it is essential that it have a flight control system that controls the vertical movement of the vehicle during flight, preferable to limit the elevation to ±10 feet in thirty seconds of time from a selected predetermined level.

It is preferred to employ an environmental chamber on the vehicle which is maintained at a stable temperature and is preferably a clean environment.

A combined use of inertial navigation and electronic distance measuring equipment provide the latitude, longitude, and speed control continuously for the pilot. This total navigation package allows the airborne vehicle to fly within a speed range of five knots and along a predetermined flight path to within a few hundred meters.

If a helicopter is employed the rotor blades are precisely tracked and aligned for smoothness of flight.

A probe for measurement only of static air pressure and not subject to ram pressure is provided to aid in measuring the elevation of the plane and is so located that only static air pressure is measured, and for a helicopter it may be on a retractable probe located in front of the helicopter or a few feet above the helicopter blades at the center of rotation of the blades. The probe is in communication with the environmental chamber.

In order to determine the altitude of the airborne vehicle a combination of radar or laser and sensitive pressure measurements are made to establish the altitude of the aircraft to within ten feet. Suitable radar equipment is available from Honeywell, Inc., Minneapolis, Minn. Suitable laser equipment is available from Spectra Physics, Inc., Mountain View, Calif.

Suitable equipment for measuring absolute pressure is available from Rosemount, Inc., Minneapolis, Minn.

Relative measurements are made and recorded of the altitude to an accuracy of the order of 0.5 feet.

The pressure altimeters are of two types. One type is an absolute device that measures the pressure and changes that occur in the atmosphere. Ground based absolute altimeters record the changes at ground level and all of these measurements are combined to establish and record pressure surface changes in the survey area.

The second type comprises two bi-directional narrow range pressure transducers which are temperature stabilized in the environmental chamber and are used to measure and record minute changes in the aircraft altitude. Such transducers are available from Setra Systems, Inc., Natick, Mass. A static air pressure source of non-turbulent air is provided to these sensors through the pressure probe that is constructed to measure no ram pressure, only static air pressure.

In order to provide a record of the accumulated data all data is recorded at a one second or other desired interval on magnetic tape. All the analog data channels are recorded at a sensitivity of the order of 0.0001 volts. Suitable equipment for this purpose comprises a digital system such as the Lancer Electronics Model 4570, available from Lancer Electronics Corp., Collegeville, Pa., interfaced to a Kennedy Model 9800 tape transport available from Kennedy, Inc., Altadena, Calif. The information is read after write on the tape and displayed on a paper tape reader. A digital voltmeter is available to visually monitor any channel of data.

In order to control the navigation of the airborne vehicle a line of sight electronic distance measuring system using multiple ground stations may be employed. One suitable type of such a control system is the Motorola Miniranger, available from Government Electronics Division, Motorola, Inc., Scottsdale, Ariz.

Another system for controlling the navigation of the airborne vehicle is known as SERIES Satellite Emission Radio Interferometric Earth Surveying available from Jet Propulsion Laboratory, Pasadena, Calif. and which formed a part of Third Annual NASA Program Review, Crustal Dynamics Project, Geodynamics Research, Jan. 26–29, 1981, Goddard Space Flight Center. An example of the system is shown in the U.S. patent to MacDoran, U.S. Pat. No. 4,170,776. Additionally, the iconospheric calibration problem recognized in the patent has been successfully addressed by a new technique called Satellite L-band Iconospheric Calibration (SLIC) which has demonstrated the ability for a single SERIES station to derive the total electron collumnar content by cross correlation of the two broadcast Globular Positioning System (GPS) channels. An important additional data-type is Doppler occurring at an effective wave length of 86 cms.

A grid pattern of equally spaced lines in two directions is selected to allow a multiple number of intersections that are data check points for all of the measurements to be made by the aircraft. These lines can provide calibration information, equipment verifications and data validity certification and each of these lines is to be flown with data therealong recorded as hereinafter pointed out.

Each ground station is located on a precise geodetic marker established using the Navy transit satellite system in the translocation mode with an excellent statistical sampling of good angle passes to compute a position to less than 1 meter in latitude, longitude and elevation.

Each transponder one of which is located at each of the ground stations is adjusted to measure a calibrated distance on a known range before being installed at the ground station.

After all the ground stations are in action the airborne vehicle is flown across the centerpoint between two stations to check the base line distance. Several passes along each base line are made before the survey begins. These calibrations and measurements are made so that the computed position will be known to an accuracy of the order of a circle of three meters diameter.

After an area of survey has been selected, a plot of lines to be flown is made. A computer listing of the grid forming the beginning and ending points of the lines and all of the intersection points of any two lines is made. This listing is entered into the computer on the aircraft.

At least three unique ranges are measured every second to to determine the aircraft position. An onboard computer calculates the aircraft position and supplies the data to the navigator plot board and to a pilot display on the flight panel. This collected data is compared to a predetermined flight path that is located in the memory of a computer in the airborne vehicle and the airborne vehicle is guided down the required path.

For purposes of assembling the desired information a modified three axis stabilized platform gravity meter available from La Coste and Romberg, Inc., Austin, Tex., or from Bell Aerosystems, Inc., Buffalo, N.Y., is used. The gravity meter is modified so that the data is recorded with only 1.5 seconds of filtering. A further modification is made to provide a shorting switch that zeros the output from the amplifiers so that the gravity meter can be stabilized in a short period of time.

All parameters of the meter and its platform are recorded every one second on magnetic tape. The gravity meter output of the total acceleration measurement as modified is recorded with little or no filtering. The stabilization time of the meter is therefore very short as the output is kept in null state electronically until the aircraft is in stable flight conditions. The meter is then allowed to accumulate the total accelerations measured by the gravity meter.

All important outputs are monitored on strip chart recorders so that the details of gravity meter operation can be observed and corrected when required. Among these outputs are the cross coupling corrections, i.e. inherent and imperfection types. These corrections are basically corrections to the meter for being slightly off level and for the mechanical components of the meter flexing under acceleration. This is set forth in more detail in the La Coste publication previously referred to at pages 501 to 505.

The mode of operation will now be pointed out.

After all the sensors have been ground calibrated, the airborne vehicle takes off and goes to the flight altitude of the survey. A reference altitude from the radar or laser altimeter is preferably made over a known elevation such as a lake or airfield.

All data is monitored in flight by analog strip chart recorders with common time events. The analog recordings are from the gravity meter of raw beam movement, spring tension, average beam movement, cross or transverse acceleration, longitudinal acceleration, heading from the inertial portion of the gravity meter, and are recorded on the tape.

Analog recordings are also available from the altimeter sensors, and of the radar or laser distance, the absolute pressure reading and the relative pressure movement and are recorded on the tape.

Analog recordings are also received from the navigation system as to each range measurement and are recorded on the tape for whichever navigation system is employed.

Additional data is also recorded on the tape and includes the line number, the time, the observed gravity, the digital radar measurement, the observed magnetics, the total correction, cross coupling, the average beam movement at different levels of filtering; five different cross couplings including cross acceleration squared, vertical acceleration squared, vertical cross coupling, longitudinal cross coupling and cross acceleration; east and north gyroscope outputs, the azimuth gyroscope, the inertial navigation heading, pressure altimeter output with additional filtering, the signal ground, simultaneously signals are digitized and sampled at a one second sampling interval and put onto the tape.

Before, during and after each flight, all information is printed on paper tape to provide assurance that data are being collected. Analog recorders continuously monitor all important signal parameters.

During flight, the operator of the gravity meter is able to change the sensitivity of the data recorders in order to monitor precisely the system performance. In this manner, he is able to check the platform level and the beam position very accurately. The beam is an internal component of the La Coste gravity meter. The beam acts as a lever between the mass in the gravity meter and the fulcrum point of the spring tension measuring screw. The zero length spring in the gravity meter is attached to the mass that is supported by the beam. The beam position is an important measurement because the automatic nulling circuit of the gravity meter requires it to be near zero or it will drive the spring tension away from the value necessary for the best readings. If this spring is driven away from null, the meter requires 10 to 30 minutes to fully stabilize for accurate readings to be recorded. The beginning of lines require concentration and a full coordination between the operator of the gravity meter, the navigator, and the pilot to prevent any elevation, course, or speed changes that would affect the beam position. In areas of steep gravity gradients or rough topography, the initial nulling of the gravity meter requires a skilled flight crew.

The onboard navigation computer and plotter provides a continuous monitor for the flight path of the airborne vehicle. Preplots of the proposed line spacings are made and fed into a navigational computer heretofore identified. After one of the lines of the preplot has been followed the airborne vehicle is returned to the start of the next line of the preplot which is followed with data available and recorded as before.

The computer vectors the pilot to the beginning of the flight line and computes the ground speed. If the flight path begins to deviate from the preplotted line, then slight course changes are made by the pilot.

At the end of the flight the airborne vehicle returns to the known reference elevation over the lake or airfield and calibrates the elevation before landing.

We claim:

1. Apparatus for airborne gravity surveying which comprises
    an airborne vehicle,
    means on said vehicle for controlling the flight of said vehicle along a preplotted path at a preselected level responding to vertical movement, including means to move the vehicle vertically without changing its pitch,
    said controlling means comprising a plurality of altimeters for determining the preselected level for correction of the path of the vehicle and providing signals for recording on a tape,
    said controlling means comprising navigating means providing signals for recording on a tape for indicating deviation of the flight of the vehicle from the preplotted path vertically and horizontally and for correction of the path of the vehicle,
    signal means including gravity meter and magnetic means providing signals for recording on a tape, means for digitalizing the signals from said gravity meter means at a predetermined sample rate and at a high order of sensitivity, recording means including a tape for recording signals from said altimeter means, said navigation means, said signal means and said digitalizing means, and computer means for indicating the departure of the vehicle from the preplotted path.

2. Apparatus for airborne gravity surveying as defined in claim 1 in which said airborne vehicle is a helicopter.

3. Apparatus for airborne gravity surveying as defined in claim 2 in which the blades of the helicopter are precisely tracked and aligned for smoothness of flight.

4. Apparatus for airborne gravity surveying as defined in claim 1 in which said plurality of altimeters includes
at least one pressure sensitive altimeter, and
an altimeter operating upon wave propagation.

5. Apparatus for airborne gravity surveying as defined in claim 4 in which one of said altimeters is a radar altimeter.

6. Apparatus for airborne gravity surveying as defined in claim 4 in which one of said altimeters is a laser altimeter.

7. Apparatus for airborne gravity surveying as defined in claim 4 in which a probe is provided for the pressure sensitive altimeter located so as to be subject only to static air pressure.

8. Apparatus for airborne gravity surveying as defined in claim 1 in which the analog data is recorded at a sensitivity of the order of 0.0001 volts.

9. Apparatus for airborne gravity surveying as defined in claim 1 in which the recording means is effective for recording digitalized signals at intervals of the order of one second.

10. Apparatus for airborne gravity surveying as defined in claim 1 in which the navigating means is a line of sight electronic distance measuring device and at least three ranges are measured within a predetermined time interval.

11. Apparatus for airborne gravity surveying as defined in claim 1 in which said preplotted path has precise geodetic members thereon derived from Navy transit satellite locations in the translocation mode.

12. Apparatus for airborne gravity surveying as defined in claim 1 in which the navigating means employs satellite radio emission interferometric means.

13. Apparatus for airborne gravity surveying as defined in claim 1 in which said gravity meter provides signals at a predetermined rate.

14. Apparatus for airborne gravity surveying as defined in claim 13 in which at least two bidirectional narrow range pressure transducers are mounted within said chamber to which air is supplied by a probe located so as to be subject only to static air pressure.

15. Apparatus for airborne gravity surveying as defined in claim 1 in which the gravity meter is capable of being stabilized in a short period of time.

16. Apparatus for airborne gravity surveying as defined in claim 1 in which a protected environmental chamber is provided within which the gravity meter is enclosed.

17. Apparatus for airborne gravity surveying as defined in claim 1 in which magnetic and gravity data are simultaneously recorded on a tape.

* * * * *